United States Patent [19]
Ando et al.

[11] 4,390,662
[45] Jun. 28, 1983

[54] CURABLE RESIN COMPOSITION

[75] Inventors: Tomonori Ando, Tokyo; Toshiaki Hanyuda, Yokohama; Satohiro Shishido; Fumiaki Sano, both of Kawasaki; Kiyoyuki Ochi, Yokohama; Toshiaki Sugimoto; Yoshiro Okino, both of Tokyo, all of Japan

[73] Assignee: Showa Highpolymer Co., Ltd., Japan

[21] Appl. No.: 247,564

[22] PCT Filed: Nov. 5, 1980

[86] PCT No.: PCT/JP80/00274
§ 371 Date: Mar. 25, 1981
§ 102(e) Date: Mar. 25, 1981

[87] PCT Pub. No.: WO81/01292
PCT Pub. Date: May 14, 1981

[30] Foreign Application Priority Data
Nov. 5, 1979 [JP] Japan ................................ 54-142957

[51] Int. Cl.$^3$ ...................... C08L 63/10; C08L 67/06; C08L 75/04
[52] U.S. Cl. ....................................... 525/28; 525/440; 525/454; 525/455; 525/920; 525/922
[58] Field of Search ............... 525/920, 922, 440, 454, 525/455, 28

[56] References Cited

U.S. PATENT DOCUMENTS

| | | | |
|---|---|---|---|
| 3,933,728 | 1/1976 | Henbest | 525/28 |
| 4,116,786 | 9/1978 | Hodakowski | 525/454 |
| 4,129,641 | 12/1978 | Ferrarini | 525/455 |
| 4,145,509 | 3/1979 | Bhatia | 525/455 |
| 4,239,796 | 12/1980 | Shanoski | 428/319.7 |
| 4,242,415 | 12/1980 | Feltzin | 525/922 |
| 4,296,215 | 10/1981 | Markiewitz | 525/440 |
| 4,317,858 | 3/1982 | Sattler | 525/920 |
| 4,348,427 | 9/1982 | Paiola | 525/920 |
| 4,357,219 | 11/1982 | Sattler | 525/454 |

Primary Examiner—Paul Liberman
Attorney, Agent, or Firm—Wenderoth, Lind & Ponack

[57] ABSTRACT

This invention relates to a curable resin composition suitable for use in the applications of casting material, coating material, putty, adhesives, various types of linings and FRP, said curable resin composition being characterized in that an unsaturated acrylic urethane prepared by addition reaction of a hydroxyl-terminated polymer, a polyisocyanate and a monohydroxylalkyl monoacrylate or a monohydroxylalkyl monomethacrylate, substantially free from an isocyanate group and having a weight-average extension of molecular chain of 100 Å or more is added to at least one of an unsaturated polyester resin and an epoxy acrylate resin in an amount effective for the development of toughness, thus the toughness of the conventional unsaturated polyester or epoxyacrylate ester being improved by admixing said unsaturated acrylic urethane therewith.

2 Claims, No Drawings

CURABLE RESIN COMPOSITION

FIELD OF THE INVENTION

The present invention relates to a hardenable resin composition which is high in toughness or tenacity and suitable for use in casting materials, coating materials, putty, adhesives, various types of linings and FRP. More particularly, the present invention pertains to an unsaturated polyester and/or an epoxy acrylate resin to which toughness is imparted by an unsaturated acrylic urethane.

BACKGROUND OF THE INVENTION

Due to its satisfactory handleability combined with its excellent properties such as mechanical and electrical properties as well as the resistance to heat and weather, unsaturated polyester resins are widely used as casting materials, coating materials, putty, adhesives, various types of linings, FRP etc. However, the unsaturated polyester resin products are hard and fragile, in other words, of less elongation and impact strength and, in most cases, incur problems such as breakage or cracking caused by impact in the course of production or transportation. Consequently, such products are considered unsuitable for use in applications where they are subjected to repeated impact and their use is indeed restricted to a considerable extent. Especially in the case of FRP, the demand for which is expanding as a substitute for metal, it is desired to improve the strength and toughness thereof, which properties are considered of vital importance. Even in the case of an epoxy acrylate resin, introduced with a view to eliminating and improving the brittleness and the resistance to chemicals of the unsaturated polyester resin, there is still much to be desired with respect to toughness.

To impart toughness to a resin, it has generally been proposed to plasticize the resin or add a rubber component thereto. In the former method, however, insufficient toughness is obtained, yet there is a decrease in heat resistance and mechanical strength. The latter method gives rise to an improvement in the toughness of a resin composition containing chopped strand glass and inorganic fillers such as BMC and SMC; however, its practical use is restricted to some extent since the resin composition is unstable; a product obtained therefrom by hardening suffers color shading; and the like. In fact, a rubber component has not been found, which has a toughness-imparting effect on FRP combined with casting or reinforcing materials.

As a result of extensive studies carried out for the purpose of obviating the disadvantages of the prior art unsaturated polyester and/or epoxy acrylate resins, it has been found that an unsaturated acrylic urethane has a toughness-imparting effect.

DESCRIPTION OF THE INVENTION

Thus, the present invention provides a curable resin composition characterized in that an unsaturated acrylic urethane prepared by addition reaction of a hydroxyl-terminated polymer, a polyisocyanate and a monohydroxylalkyl monoacrylate and/or a monohydroxylalkyl monomethacrylate (hereinafter referred to as the hydroxyl acrylates), substantially free from an isocyanate group and having a weight-average extension of molecular chain of 100 or more Å calculated as polystyrene and as measured by gel permeation chromatography is added to at least one of an unsaturated polyester resin and an epoxy acrylate resin in an amount effective for the development of toughness.

In the present invention, no particular limitations are imposed upon the composition of the unsaturated polyester resin and epoxy acrylate resin used. In consideration of the mechanical strength and heat resistance which, in most cases, should be of sufficient value, however, it is desired that the thermal deformation temperature of the cast product be on the order of higher than 50° C. In this connection, it should be noted that the use of a resin having a thermal deformation temperature of less than 50° C. is not excluded from the scope of the present invention.

The unsaturated acrylic urethane which is a characteristic component of the resin composition according to the present invention is a mixture having a structure defined by the following formula:

$$2CH_2=\overset{R_1}{\underset{\underset{O}{\|}}{C}}-C-O-R_2-OH + (n+1)OCN-R_3-NCO + nHO-R_4-OH \longrightarrow$$

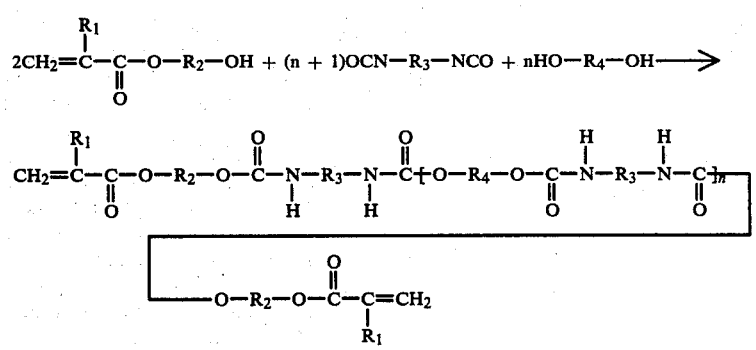

where
R$_1$ stands for H or CH$_3$;
R$_2$ a C$_{2-3}$ alkylene group;
R$_3$ a polyisocyanate residual group;
R$_4$ a residual group derived from a polyhydroxyl polymer; and
n a positive integer.

This mixture should have a weight-average extension of molecular chain of 100 or more Å, preferably 100 to 1500 Å calculated as polystyrene. The value for n is determined such that the above-defined weight-average extension of molecular chain is met. This is achieved by the use of a chain extender polyisocyanate depending upon the extension of molecular chain of the hydroxyl-terminated polymer. No particular inconvenience is encountered, even if some branching of the unsaturated acrylic urethane takes place due to the fact that the polyisocyanate and the hydroxyl-terminated polymer are tri- or more-functional. Accordingly, the urethane is not necessarily limited to the linear structure as illustrated in the foregoing formula. The unsaturated acrylic urethane may not necessarily have both of its terminals linked to two acrylic of methacrylic acids by way of unsaturated bonding. However, it is required that the kinds and chemical equivalent ratio of the starting reactants be selected such that the degree of branching is 0.5 or less per molecule and the degree of the acrylic and-/or methacrylic unsaturated bond is 1.2 to 2.5 in the unsaturated acrylic urethane molecule on number-average.

In the present invention, no limitations are placed upon the method for the preparation of the unsaturated acrylic urethane as well as the hydroxyl-terminated polymer and the polyisocyanate being the components thereof. Depending upon the economical requirement, the working environment, the stability factor during production and the like, use may then be made of a variety of materials and techniques widely available for the preparation of polyurethane resins such that the weight-average extension of molecular chain, the degree of branching and the number of unsaturated terminal groups fall within the above-defined range.

The hydroxyl-terminated polymer being one constituent of the unsaturated acrylic urethane includes a hydroxyl-terminated polyester, a polyether polyol or a mixture thereof. The hydroxyl-terminated polyester is prepared from an acid component selected from a saturated polybasic acid, its anhydride or lower alkyl ester and an unsaturated polybasic acid or its anhydride, and a polyvalent alcohol, an alkylene oxide or a monoepoxy compound in excess of hydroxyl groups, if required with the use of a catalyst for the acceleration of reaction, by esterification or ester exchange reaction. The reaction product may then be dissolved in a polymerizable monomer or a solvent in the presence of a minor amount of a polymerization inhibitor so as to permit easy handling thereof in a later stage. It is desired that the acid number of the hydroxyl-terminated polyester be 2 or less, preferably as low as possible, and that the hydroxyl number be in a range of 35 to 150, preferably 45 to 80. The saturated polybasic acid or its anhydride or lower alkyl ester include phthalic anhydride, dimethyl terephthalate, isophthalic acid, succinic acid, adipic acid, sebacic acid, dimer acid, tetrabromophthalic anhydride, tetrahydrophthalic anhydride, methyltetrahydrophthalic acid, HET acid or a mixture thereof. The unsaturated polybasic acid or its anhydride include maleic anhydride, fumaric acid, itaconic acid etc. or a mixture thereof. The polyvalent alcohol includes ethylene glycol, diethylene glycol, propylene glycol, dipropylene glycol, butanediol-1,4,hexanediol-1,6 neopentyl glycol, 2,2-di(4-hydroxypropoxyphenyl)-propane, hydrogenated bisphenol A, cyclohexanedimethanol, trimethylolpropane, hexanetriol, glycerin, dibromoneopentyl glycol etc. or a mixture thereof. The alkylene oxide and monoepoxy compound include ethylene oxide, propylene oxide, tetrahydrofuran, phenylglycidyl ether and so on. Care should be taken of the amount of triol used such that the degree of branching is restricted to at most 0.5 per molecule on number-average. As the hydroxyl-terminated polyester, use may be made of a lactone ester obtained by the polymerization of epsilon-caprolactone or the like using as an initiator glycols.

The polyether polyol should have a hydroxyl number of 35 to 150 and 1.95 to 2.60 of hydroxyl groups per molecule on number-average, and is prepared by the polymerization of ethylene oxide, propylene oxide, 1,2-butylene oxide, 2,3-butylene oxide, tetrahydrofuran or the like using as an initiator a polyol such as ethylene glycol, propylene glycol, butanediol, glycerin, trimethylolpropane etc. Use may also be made of the copolymerization type of polyether polyol. For example, mentioned are poly(oxypropylene)triol, poly(oxyethylene)-triol, poly(oxypropylene)poly(oxyethylene)triol, poly-(oxypropylene)poly(oxyethylene)poly(oxypropylene)-triol or the like derived from a corresponding triol such as polyoxyethylene glycol, polyoxypropylene glycol, poly(oxypropylene)poly(oxyethylene) glycol, poly(oxybutylene)glycol, poly(oxytetramethylene) glycol, glycerin, trimethylolpropane or the like, or mixtures thereof. The above-mentioned polyhydroxyl polymer may be a mixture of the foregoing constituents.

The hydroxyacrylate includes hydroxyethylacrylate, -methacrylate; hydroxypropyl-acrylate, -methacrylate; an addition product of a monoepoxy compound and acrylic or methacrylic acid, such as an addition product of epichlorohydrin and acrylic or methacrylic acid, or mixtures thereof. The polyisocyanate being one constituent of the unsaturated acrylic urethane includes phenylene diisocyanate, tolylene diisocyanate, xylylene diisocyanate, diphenylmethane diisocyanate, naphthalene diisocyanate, polymethylene polyphenylene isocyanate, hexamethylene diisocyanate, diaryl isocyanate, isophorone diisocyanate etc. and their isomers or hydrogenated products, and derivatives thereof which are modified in consideration of handleability and toxicity. These substances may be used alone or in the form of a mixture of two or more thereof.

The unsaturated acrylic urethane is prepared from the hydroxyl polymer, the hydroxyacrylates and the polyisocyanate by allowing them to react, if required, in the presence of a polymerizable monomer or a solvent, a polymerization inhibitor and a catalyst for the urethane-forming reaction. Preferably, the reaction is carried out in either one of the following manners A and B depending upon the reactivity and charging ratio of starting materials. Manner A: The hydroxyl polymer and the hydroxyacrylates are introduced into a reactor, and the polyisocyanate is then charged all at once, or in several portions, or otherwise added dropwise. Manner B: The hydroxyl polymer is permitted to react with the isocyanate, followed by the reaction of the hydroxyacrylates. In order to decrease the viscosity of the reaction product and cause the reaction to proceed uniformly, use is made of a polymerizable monomer such as styrene, vinyltoluene, diallyl phthalate, methyl methacrylate etc., and a solvent such as toluene, xylene, Cellosolve acetate, ethyl acetate, butyl acetate methyl isobutyl ketone, methyl ethyl ketone, cyclohexanone, methylene chloride etc. The solvent is removed after the completion of the reaction. A polymerization inhibitor such as hydroquinone, benzoquinone, t-butyl catechol, copper naphthenate etc. is added to the reaction system to prevent polymerization due to the acrylic or methacrylic residual groups and the polymerizable monomer. However, feeding of dry air is effective for that purpose. When the catalyst for the urethane-forming reaction is selected from among commecial catalysts available for the production of polyurethane resins, it is required that the selected catalyst restrain a side reaction giving rise to branching which takes no part in the urethane-forming reaction, and have an adverse influence on the curing characteristics and stability of the unsaturated acrylic urethane and the resin composition according to the present invention. The catalyst used includes triethylamine, triethylenediamine, N-methylmorpholine, zinc naphthenate, cobalt naphthenate, copper octoate, dibutyltin dilaurate or the like.

When the equivalent ratio of the total NCO: the total hydroxy (NCO/OH) in the charge stock exceeds 1.0, a crosslinking reaction is liable to occur. Accordingly, the ratio is limited to 0.7 to 1.0, preferably around 0.95 in view of the reactivity and the degree of branching of starting materials. The reaction temperature applied is kept at 120° C. or less, preferably 50° to 80° C. so as to restrain the crosslinking reaction from taking place. The progress of the reaction is checked by the chemical analysis of the isocyanate. In a later stage of the reaction, infrared spectroscopic analysis is applied. The reaction is regarded as being completed when there is no absorption of infrared rays by NCO. The crosslinking reaction caused by the isocyanate which may still remain in the reaction system can be avoided by the addition of a small amount of a hydroxyl compound.

In order to prevent the polyisocyanate from undergoing an undesirable reaction with water, it is desired to use the starting materials, the polymerizable monomer and the solvent in the water-free form.

A completely clear account is not given of the mechanism through which the unsaturated acrylic urethane used in the present invention produces a toughness-imparting effect. It has been found with the naked eye that, when the urethane has a marked toughness-imparting effect on the resin composition composed mainly of an unsaturated polyester and prepared according to the present invention, the composition assumes a milk white color upon curing. It is therefore presumed that the molecular weight of the unsaturated acrylic urethane and the concentration of the urethane links or the acrylic or methacrylic residual groups contained therein function and present an "ideal polymer blend" phenomenon. Probably, this results in the unsaturated acrylic urethane providing a minute and optimum rubbery dispersion layer in a firm matrix layer consisting of the unsaturated polyester resin, so that a strong bond is made between the interface of the matrix and dispersion layers. Accordingly, since the present invention makes it a condition that, upon curing of the resin composition of the present invention, the unsaturated acrylic urethane is separated therein as a dispersion layer made as minute as possible, it is desired that the urethane generally have a linear structure with its weight-average extension of molecular chain being 100 or more Å. This is also determined taking into consideration the compatibility relative to the resin of the matrix layer. At less than 100 Å, the obtained toughness-imparting effect is limited. An increase in the weight-average chain length does not always lead to additional improvements in the physical properties of the cured product. Therefore, it is preferable to apply the chain length of at most 1500 Å from a practical standpoint. The chain length exceeding 1500 Å results in a rise in viscosity and hence a lowering of handleability, and is not preferred. Thus, the weight-average chain length is preferably 200 to 1000 Å, more particularly 300 to 1000 Å. However, the concept of the present invention does not exclude the application of the urethane having a weight-average chain length exceeding 1500 Å. In order to form a more effective rubbery dispersion layer, the hydroxyl polymer forming part of the unsaturated acrylic urethane consists preferably of an aliphatic chain. In order to improve the compatibility of the hydroxyl polymer relative to the resin providing the matrix layer and the resistance thereof to heat and chemicals, however, it is sometimes advantageous to apply an aromatic chain, a branched chain or an unsaturated chain. The amount of the unsaturated acrylic urethane added according to the present invention depends upon the weight-average extension of molecular chain and the process for curing the resin composition. The urethane is less effective in an amount of less than 0.5% by weight, but has an adverse influence on the mechanical properties of the hardening resin composition in an amount exceeding 70% by weight. Accordingly, the urethane is preferably used in an amount of 0.5 to 70% by weight, more particularly 1 to 50% by weight. The urethane is effective in smaller amounts when the resin composition is cured upon heating. When the composition is cured at normal temperature, however, it is required to use the urethane in relatively large amounts. In general, the unsaturated acrylic urethane having a greater weight-average chain length is used in smaller amounts, while the urethane having a smaller chain length should be applied in greater amounts. When the impact strength of the resin composition is improved so as to apply it as casting material, the urethane should be used in greater amounts; when the impact strength of the composition is improved so as to apply it as FRP, it should be added in smaller amounts; and when the elongation of the composition is improved, it should be used in greater amounts. Thus, the unsaturated acrylic urethane is selectively determined depending upon the desired application and purpose.

On the other hand, it has been found with the naked eye that the resin composition containing as one main component an unsaturated epoxy acrylate resin and the unsaturated acrylic urethane mixed therewith does not exhibit a milk white color upon being cured at normal temperature. It is therefore presumed that toughness is provided to the composition through a mechanism different from that for the unsaturated polyester resin. The epoxy acrylate resin is characterized by a shorter molecular chain length as compared with the unsaturated polyester, its terminals crosslinked in common to the unsaturated acrylic urethane and the like. In this connection, it is probable that no perceptible phase separation takes place.

Like the epoxy acrylate resin or the unsaturated polyester resin, the resin composition according to the present invention can be cured at room temperature or elevated temperature with an organic peroxide. Like the epoxy acrylate resin, the present resin composition may be cured with the use of activated rays such as light rays, ultraviolet rays, electron radiation, etc.

THE MOST PREFERRED EMBODIMENTS OF THE INVENTION

Example 1

300 ppm of hydroquinone were added to an unsaturated polyester having an acid number of 35 and prepared from 665 g (4 moles) of isophthalic acid, 588 g (6 moles) of maleic anhydride and 798 g (10.5 moles) of propylene glycol in the conventional two-stage reaction. The resulting product was then dissolved in styrene to obtain an unsaturated polyester resin having an unvolatile content of 60% (hereinafter referred to as Polyester A). Apart from this resin, a hydroxyl polyester having an acid number of 0.2 and a hydroxyl number of 54 (hereinafter termed Polyester B) was prepared from 874 g (11.5 moles) of propylene glycol and 1460 g (10 moles) of adipic acid. 2080 g (hydroxyl equivalent: 2) of Polyester B were dissolved in 2457 g of styrene and 0.74 g of hydroquinone with the application of heat. To the obtained solution were added dropwise at a controlled temperature not exceeding 60° C. over one hour 261 g (isocyanate equivalent: 3) of tolylene diisocyanate (manufactured by Nippon Polyurethane Kogyo Kabushiki Kaisha under the name of DESMODULE T-80). Subsequently, the reaction was allowed to continue for one further hour. To the reaction product were then added dropwise for 30 minutes a mixture of 116 g (1 mole) of hydroxyethyl acrylate and 0.49 g of dibutyltin dilaurate. Subsequently, the reaction was allowed to continue at 70° C. for 2.5 hours, and terminated after no absorption of infrared rays by NCO was observed in the vicinity of 2270 cm$^{-1}$ with an infrared spectrometer, thereby to obtain a 50% styrene solution of an unsaturated acrylic urethane having a weight-average extension of molecular chain of 550 Å (hereinafter called Acrylic Urethane C).

In a similar manner, a 50% styrene solution of an unsaturated acrylic urethane (hereinafter termed Acrylic Urethane D), substantially free from an isocyanate group, was prepared from 2080 g (hydroxyl equivalent: 2) of Polyester B, 2653 g of styrene, 0.80 g of hydroquinone, 341 g (isocyanate equivalent: 3.92) of tolylene diisocyanate, 0.35 g of dibutyltin dilaurate and 232 g (2 moles) of hydroxylethyl acrylate. The weight-average extension of molecular chain of this urethane was 300 Å.

In the same manner as Acrylic Urethane C, a 50% styrene solution of an unsaturated acrylic urethane (hereinafter termed Acrylic Urethane E) substantially free from an isocyanate group and having a weight-average extension of molecular chain of 195 Å was prepared from 1660 g (4 equivalents) of a polymerized ester (hydroxyl number: 135) obtained from the reaction of epsiloncaprolactone using ethylene glycol as an initiator, 0.73 g of hydroquinone, 2442 g of styrene, 522 g (6 equivalents) of tolylene diisocyanate, 260 g (2 moles) of 2-hydroxypropyl acrylate and 0.50 g of dibutyltin dilaurate. A diester was prepared from 1 mole of terephthalic acid and 2.05 moles of neopentyl glycol in the conventional manner. The acid number and hydroxyl number of this diester were 0.2 and 338, respectively. To 332 g (2 equivalents) of this diester were added dropwise at a controlled temperature not exceeding 70° C. over two hours 444 g (4 equivalents) of isophorone diisocyanate. The reaction was allowed to continue for further one hour. 0.53 g of hydroquinone was added to the reaction product, to which were added dropwise for two hours 710 g of styrene, 288 g (2 moles) of hydroxylpropyl methacrylate and 0.18 g of dibutyltin dilaurate in a stream of dry air. Subsequently, the reaction is allowed to continue for three hours and terminated after the disappearance of isocyanate groups was confirmed, thereby to obtain an unsaturated acrylic urethane (hereinafter termed Acrylic Urethane F) having a weight-average extension of molecular chain of 65 Å. Acrylic Urethane F was found to have an unvolatile content of 60%.

3105 g (3 equivalents) of polytetramethylene ether glycol having a hydroxyl number of 54.2, 2523 g of Cellosolve acetate, 1.5 g of hydroquinone and 130 g (1 mole) of hydroxylpropyl acrylate were dissolved at 50° C. with the application of heat. To the obtained solution were added dropwise at a controlled temperature not exceeding 70° C. for 1.5 hours 550 g (3 equivalents) of MILLIONATE MTL (a modification of diphenylmethane diisocyanate made by Nippon Polyurethane Kogyo Kabushiki Kaisha). Subsequently, the reaction was allowed to continue for 4 hours. After it was confirmed that no NCO remained in the reaction system, the Cellosolve acetate was removed under reduced pressure to prepare an unsaturated acrylic urethane (hereinafter termed Acrylic Urethane G) having a weight-average extension of molecular chain of 780 Å.

3978 g (4 equivalents) of polyoxypropylene glycol having a hydroxyl number of 56.4 and 2025 g of Cellosolve acetate were heated to 50° C. and dissolved. To the resulting solution were added dropwise at a controlled temperature not exceeding 60° C. for one hour 487 g (5.8 equivalents) of tolylene diisocyanate. Subsequently, the reaction was allowed to continue for one hour. Chemical analysis indicated that the reactivity of isocyanate was 25%. 1.9 g of hydroquinone were added to the reaction product, to which were added dropwise for one hour a mixture of 260 g (2 moles) of hydroxylethyl methacrylate and 1.4 g of dibutyltin dilaurate while feeding air into the reaction system. Thereafter, the reaction was allowed to continue at 70° C. for three hours and terminated after it was confirmed that no NCO groups remained in the system. The cellosolve acetate was removed under reduced pressure to obtain an unsaturated acrylic urethane (hereinafter termed Acrylic Urethane H) having a weight-average extension of molecular chain of 450 Å.

Resin compositions as set forth in Table 1 were prepared by adding to the above-mentioned samples HIKER HTE 2216×1 (liquid rubber of epichlorohydrin having a molecular weight of 6000 and made by B. F. Goodrich Chemical, Inc.), and were cured at room temperature with a peroxide to obtain hardened products for casting, which were then put under test according to JIS K 6911 and JIS K 5400. The results are also shown in Table 1.

TABLE 1

|  |  |  | blank | 1 | 2 | 3 | 4 | 5 | 6 | 7 | 8 | weight-average extension of molecular chain (Å) |
|---|---|---|---|---|---|---|---|---|---|---|---|---|
| Blending | Polyester | A | 100 | 80 | 60 | 60 | 60 | 65 | 60 | 60 | 75 |  |
| Ratio | Acrylic Urethane | C |  | 20 | 40 |  |  |  |  |  |  | 550 |
| (parts by | Acrylic Urethane | D |  |  |  | 40 |  |  |  |  |  | 300 |
| weight) | Acrylic Urethane | E |  |  |  |  | 40 |  |  |  |  | 195 |
|  | Acrylic Urethane | F |  |  |  |  |  | 35 |  |  |  | 65 |
|  | Acrylic Urethane | G |  |  |  |  |  |  | 20 |  |  | 780 |
|  | Acrylic Urethane | H |  |  |  |  |  |  |  | 20 |  | 450 |
|  | HIKER HTE |  |  |  |  |  |  |  |  |  | 15 |  |
|  | Styrene |  |  |  |  |  |  |  | 20 | 20 | 10 |  |
| Properties | thermal deformation temperature (°C.) |  | 118 | 112 | 92 | 95 | 98 | 115 | 87 | 87 | 89 |  |

TABLE 1-continued

| | | blank | 1 | 2 | 3 | 4 | 5 | 6 | 7 | 8 | weight-average extension of molecular chain (Å) |
|---|---|---|---|---|---|---|---|---|---|---|---|
| tensile strength (kg/mm²) | (a) | 3.5 | 5.0 | 6.3 | 5.7 | 5.5 | 3.9 | 6.5 | 6.4 | 4.1 | |
| elongation (%) | (b) | 1.4 | 2.5 | 6.5 | 3.7 | 2.3 | 1.6 | 6.7 | 6.6 | 2.4 | |
| tensile modulus (kg/mm²) | | 320 | 280 | 210 | 260 | 270 | 300 | 200 | 200 | 305 | |
| Du Pont impact (mg × 300 g) | | 10 | 20 | 35 | 25 | 20 | 12 | 40 | 40 | 12 | |
| Charpy impact strength (kg-cm/cm²) | | 2.0 | 3.3 | 6.5 | 4.0 | 3.5 | 2.3 | 6.7 | 6.6 | 2.2 | |
| appearance of cured product under macroscopic observation | | transparent | milk white color | 6.5 | 4.0 | 3.5 | transparent | milk white color | 6.6 | transparent | |
| (a) × (b) | | 4.9 | 12.5 | 41.0 | 21.1 | 12.7 | 6.2 | 43.6 | 42.2 | 9.8 | |

Toughness is sometimes expressed in terms of an area defined by a stress-strain curve extending to a rupture point on a stress-strain diagram with stress as abscissa and strain as ordinate. In estimation, however, the present invention simply relied upon the product of the tensile strength (a) and the elongation (b), on the assumption that the curve can be regarded as a straight line. As a result, it has been found that toughness depends upon the constituents of the unsaturated acrylic urethane to a less extent, and that when the urethane has an effective weight-average extension of molecular chain, sufficient toughness is obtained with a small lowering of thermal deformation temperature. In No. 5 run of Table 1, the urethane has a shorter weight-average extension of molecular chain and hence a less effect as compared with Blank run, but has a greater effect as the chain length is greater. In No. 6 run, the effect is saturated. In No. 8 run, where HIKER HTE is used, the cured product does not assume a milk white color. This means that the effect of HIKER is only twice that obtained in Blank run.

Example 2

A hydroxyl polyester having an acid number of 0.3 and a hydroxy number of 48.1 was prepared from 714 g (11.5 moles) of ethylene glycol and 1460 g (10 moles) of adipic acid in the conventional manner. 400 ppm of hydroquinone were added to this polyester to obtain a 50% styrene solution of the polyester. 4676 g (2 equivalents) of this solution were allowed to react with 248 g (2.85 equivalents) of tolylene diisocyanate and 116 g (1 mole) of hydroxyethyl acrylate at 65° C. or less for two hours. To the resulting reaction product were added dropwise over 1.5 hours 364 g of styrene and 2.7 g of dibutyltin dilaurate. The reaction was allowed to continue at 70° C. for further two hours until no NCO remained in the reaction system, thereby to obtain a 50% styrene solution of an unsaturated acrylic urethane (hereinafter called Acrylic Urethane I). The urethane was found to have a weight-average extension of molecular chain of 600 Å.

Apart from this, a hydroxyl polyester (hereinafter called Polyester J) having an acid number of 0.3 and a hydroxyl number of 60.4 was prepared from 767 g (6.5 moles) of hexanediol—1, 6, 520 g (5 moles) of neopentyl glycol, 498 g (3 moles) terephthalic acid, 730 g (5 moles) of adipic acid and 196 g (2 moles) of maleic anhydride. 1858 g (2 equivalents) of the polyester was dissolved in 2321 g of styrene containing 1.4 g of hydroquinone, and allowed to react with 333 g (3 equivalents) of isophorone diisocyanate at around 55° C. for three hours. 130 g (1 mole) of hydroxyethyl methacrylate containing 2.3 g of dibutyltin dilaurate were added dropwise to the reaction product while feeding air into the reaction system. The reaction was allowed to continue at 60° C. for further four hours until no NCO remained substantially in the system. The reaction product was then cooled with the addition of 30 g of a 50% styrene solution of Polyester J to obtain a 50% styrene solution of an unsaturated acrylic urethane (hereinafter called Acrylic Urethane K). This urethane was found to have a weight-average extension of molecular chain of 380 Å.

The thus prepared unsaturated acrylic urethanes were blended with LIPOXY R-806 (a bisphenol-based epoxy acrylate manufactured by Showa Kobunshi Kabushiki Kaisha) and Lipoxy H-600 (a novolak-based epoxy acrylate manufactured by Showa Kobunshi Kabushiki Kaisha), and were cured in the same manner as described in Example 1. The properties of the cured products measured are shown in Table 2.

TABLE 2

| | | | | | | No. | | | | | weight average extension of molecular chain (Å) |
|---|---|---|---|---|---|---|---|---|---|---|---|
| | | | blank | 11 | 12 | 13 | 14 | 15 | 16 | 17 | |
| Blending Ratio (parts by weight) | LIPOXY R-806 | | 100 | 80 | 70 | 60 | 20 | | 50 | 30 | |
| | LIPOXY H-600 | | | | | | | 100 | | | |
| | Acrylic Urethane | I | | 20 | 30 | 40 | 80 | | | 30 | 600 |
| | Acrylic Urethane | K | | | | | | | 50 | | 380 |
| | Polyester | A | | | | | | | | 40 | |
| Properties | thermal deformation temperature (°C.) | | 105 | 82 | 70 | 59 | 30 | 151 | 128 | 72 | |
| | tensile strength | (a) | 7.6 | 7.8 | 7.2 | 5.6 | 2.5 | 6.8 | 6.6 | 5.5 | |

TABLE 2-continued

|  |  | blank | 11 | 12 | 13 | 14 | 15 | 16 | 17 | weight average extension of molecular chain (Å) |
|---|---|---|---|---|---|---|---|---|---|---|
| (kg/mm$^2$) elongation (%) | (b) | 3.5 | 4.9 | 6.1 | 9.8 | 140 | 2.5 | 3.5 | 8.9 | |
| tensile modulus (kg/mm$^2$) | | 330 | 320 | 290 | 240 | 35 | 360 | 320 | 250 | |
| Charpy impact strength (kg-cm/cm$^2$) | | 2.9 | 4.2 | 5.3 | 6.2 | not broken | 1.9 | 3.5 | 6.8 | |
| content of unsaturated acrylic urethane (% by weight)* | | 0 | 11 | 17.7 | 25 | 66.7 | 0 | 23.3 | 17.7 | |
| (a × b) | | 26.6 | 38.2 | 43.9 | 54.9 | 350 | 17 | 23.1 | 49.0 | |

*% by weight = $\frac{\text{Weight of unsaturated acrylic urethane compound} \times 100}{\text{Weight of (polyester resin + epoxy acrylate resin + unsaturated acrylic urethane compound)}}$ Note that the term polyester resin or epoxy acrylate resin refers to resin containing polymerizable monomer.

In the runs where varying amounts of the unsaturated acrylic urethane are mainly added to an epoxy acrylate resin, it is found that an increase in the amount of the urethane results in a slight lowering of HDT but a marked increase in elongation. All the cured products inclusive of No. 17 run where an unsaturated polyester resin was further blended with the epoxy acrylate resin did not assume a milk white color under macroscopic observations.

Example 3

In accordance with the conventional manner, 485 g (2.5 moles) of dimethyl terephthalate, 735 g (7.5 moles) of maleic anhydride and 799 g (10.5 moles) of propylene glycol were subjected to ester exchange reaction and then estrification to prepare an unsaturated polyester having an acid number of 35. 250 ppm of benzoquinone were added to the reaction product, which was dissolved in styrene, thereby to obtain an unsaturated polyester resin (hereinafter called Polyester L) having an unvolatile content of 60%.

On the other hand, 300 parts by weight of polystyrene beads (molecular weight: about 200,000) were added to 700 parts of hot styrene containing 0.5 parts of benzoquinone, and were then dissolved at 60° C. to prepare a polystyrene liquid. In a similar manner, 700 parts of HIKER CTBN 1300×15 (modified liquid polybutadiene manufactured by B. F. Goodrich Chemical, Inc.) were dissolved in 300 parts of styrene containing 0.5 parts of hydroquinone to prepare a HIKER liquid.

The thus prepared products were blended with Acrylic Urethane I of Example 2 at the blending ratios as shown in Table 3 to prepare resins, which were then mixed with 1.0 part of t-butyl peroxybenzoate, 4 parts of zinc stearate, 100 parts of calcium carbonate, 6 parts of a coloring agent, 1.0 part of magnesium oxide to prepare soup. To this soup were added 30% of chopped strand glass having a length of 1 inch to form SMC. A flat plate of SMC was molded to estimate the appearance and properties thereof.

TABLE 3

|  |  | blank | 21 | 22 | 23 | 24 | 25 | 26 |
|---|---|---|---|---|---|---|---|---|
| Blending Ratio (parts by weight) | Polyester L | 80 | 80 | 80 | 80 | 80 | 90 | 90 |
| | Polystyrene liquid | 20 | 20 | 20 | 20 | 20 | | |
| | HIKER liquid | | 8 | 14 | | | 10 | |
| | Acrylic urethane I | | | | 10 | 15 | | 10 |
| Properties | color shading | none | less occurring | occuring | none | none | less occurring | none |
| | Charpy impact strength (kg-cm/cm$^2$) | 82.9 | 78.5 | 80.3 | 80.3 | 85.0 | 79.5 | 81.8 |
| | impact strength at which cracking occurs | 11.9 | 23.2 | 24.2 | 25.2 | 27.0 | 14.3 | 18.7 |

Since the unsaturated polyester has a high compatibility with respect to the unsaturated acrylic urethane, they are present in a stable state and easy to handle. However, the unsaturated polyester, for instance, Polyester L premixed with the HIKER liquid cannot be allowed to stand for more than one hour since the HIKER liquid is separated from the mixture. Referring to color shading appearing on the molded surface of SMC, no color shading is observed if the amount of HIKER is up to 8 parts. In an amount exceeding 8 parts, however, color shading appears. The acrylic urethane liquid gives rise to no color shading in a amount of as many as 15 parts. It is also found under macroscopic observations that Acrylic Urethane I is superior in the surface smoothness-imparting effect to HIKER. This implies that a low-shrinkage effect is obtained. No difference in strength is found between the samples in Charpy impact test according to JIS K 6911. Charpy impact testing was carried out at varying angles of a pendulum striker under different loads for the comparison of impact values at which cracking occurs. As a result, it has been found that the HIKER liquid-containing sample has a greater impact strength as compared with that of Blank run, and that the Acrylic Urethane I-containing sample is by far superior in impact strength to the HIKER-containing sample. It is expected that the present invention has a similar effect on FRP prepared by preform MMD and BMC.

EXAMPLE 4

Using the resin compositions of Blank and No. 2 runs of Example 1, FRP plates were made from 4 chopped strand glass mats of 450 g/m² by hand lay-up molding. These plates were examined on their mechanical strength properties at 20° C. according to JIS K 6911. The results are shown in Table 4.

TABLE 4

|  | Unit | No. 41 (blank) | No. 42 |
|---|---|---|---|
| Polyester A | parts by weight | 100 | 60 |
| Acrylic Urethane C | parts by weight |  | 40 |
| tensile strength (a) | kg/mm² | 12.3 | 14.5 |
| elongation (b) | % | 1.5 | 2.6 |
| (a) × (b) |  | 18.5 | 37.7 |
| tensile modulus | kg/mm² | 1,100 | 800 |
| bending strength | kg/mm² | 23.8 | 22.9 |
| bending modulus | kg/mm² | 1,000 | 800 |
| glass content | % by weight | 33.4 | 32.7 |

Note:
Curing Conditions: MEKPO/cobalt naphthenate = 1.0/0.5 phr 20° C./20 hours + 40° C./16 hours It is found that the FRP plate containing Acrylic Urethane C has very desirable advantages over that of Blank run; it has a similar strength and a greater elongation with a slight lowering of elastic modulus.

EXAMPLE 5

The resin compositions shown in Table 5 were prepared from Polyester A and Acrylic Urethane C of Example 1 and HIKER VTBN 1300×14 (vinyl-terminated, modified and liquid polybutadiene rubber manufactured by B. F. Goodrich Chemical, Inc.). In a similar manner to that of Example 4, FRP plates were made and subjected to flatwise impact testing according to JIS K 6911. The results are given in the following Table.

TABLE 5

|  | No. |  |  |  |  |  |
|---|---|---|---|---|---|---|
|  | (Unit: kg-cm/cm²) | | | | | |
|  | blank | 51 | 52 | 53 | 54 | 55 |
| Polyester A | 100 | 100 | 100 | 100 | 100 | 100 |
| Acrylic Urethane C | parts by weight | 2 | 4 | 8 | 16 |  |
| HIKER VTBN (1) |  |  |  |  |  | 8 |
| impact value JIS K 6911) | 77 | 78 | 77.5 | 79 | 90.5 | 77 |
| impact value at which cracking occurs | 8.6 | 9.6 | 10.4 | 12.4 | 15.0 | 8.4 |
| impact value at which whitening occurs | 31.2 | 32.7 | 33.5 | 34.2 | 37.2 | 38.2 |
| impact value at rupture | 30 | 45 | 50 | 50 | 50 | 40 |
| glass content (% by weight) | 32.5 | 31.9 | 32.8 | 33.2 | 32.4 | 33.4 |
| content of unsaturated acrylic urethane (2) | 0% by weight | 1.0 | 2.0 | 3.8 | 7.4 | (5.3) |

(1) Styrene solution having a non-volatile content of 70% by weight. The curing conditions are the same as in Table 4.
(2) The same as the note in Table 2.

The impact value of No. 54 run is slightly larger than that stipulated in JIS K 6911; there is no significant difference. According to tests carried out with different loads being applied on the samples, the impact values at which cracking occurs increases in substantial proportion to the amount of the urethane acryl used, and reaches a value about twice that of Blank run in an amount of 16 parts. However, the HIKER run is on the same level as Blank run. Referring to the impact value at which a rupture occurs through whitening, it has been found that the No. 51 run containing 2 parts of Acrylic Urethane C is much more effective than No. 55 run.

Possibility of Industrial Use

Casting of the resin composition according to the present invention produces a hardened product which has markedly improved elongation and impact strength with the retention of heat resistance. This hardened product exhibits excellent cutting workability without causing a decrease in the thickness and heat-resistance required for a coating film, when it is colored and used as a coating material for decorative laminate plastics. When the hardened product is used as various types of linings or primers for metal, cement, concrete etc., it also exhibits satisfactory performance relative to mechanical or thermal impacts. In particular, it has been found that when the resin composition according to the present invention is applied as a resin for preform MMD (matched metal die), BMC and SMC, it imparts toughness thereto, brings about a low-shrinkage effect due to the phase separation of the molten unsaturated acrylic urethane component during hardening, and causes no color shading. In addition, the resin composition according to the present invention can impart practically high toughness to FRP articles prepared by a variety of processes such as hard lamination, spray-up, FW (filament winding) or the like using reinforcements ranging from glass fibers and carbon fibers to a slight amount of inorganic fillers.

What is claimed is:
1. A curable resin composition which comprises:
   (a) an unsaturated acrylic urethane prepared by the addition reaction of a hydroxyl-terminated polymer, a polyisocyanate and a monohydroxylalkyl monoacrylate or a monohydroxylalkyl monomethacrylate, substantially free from isocyanate groups and having a weight-average extension of molecular chain of 100 Å or more and
   (b) at least one member selected from the group consisting of an unsaturated polyester resin and an epoxy acrylate resin,
      said unsaturated acrylic urethane being present in an amount effective to increase the toughness of component (b).
2. The composition according to claim 1 wherein component (a) is present in an amount of 0.5 to 70% by weight of said composition.

* * * * *